(12) United States Patent
Yeh

(10) Patent No.: US 7,045,726 B1
(45) Date of Patent: May 16, 2006

(54) PRESSURE REGULATOR FOR A PAINT BALL GUN

(75) Inventor: Hsin-cheng Yeh, Yung Kang (TW)

(73) Assignee: Sunworld Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 11/195,627

(22) Filed: Aug. 3, 2005

(51) Int. Cl.
*H01H 29/28* (2006.01)

(52) U.S. Cl. ............... 200/81 R; 200/81.6; 137/505.28

(58) Field of Classification Search .............. 200/81 R, 200/82 R, 81.6, 81.9, 81 H; 137/505.28, 137/505.25, 625.69
See application file for complete search history.

(56) References Cited

U.S. PATENT DOCUMENTS

| 3,772,490 A | * | 11/1973 | Thordarson | 200/286 |
| 5,040,732 A | * | 8/1991 | Anderson et al. | 239/707 |
| 5,304,757 A | * | 4/1994 | Hensel | 200/82 R |
| 5,494,024 A | * | 2/1996 | Scott | 124/73 |
| 5,669,369 A | * | 9/1997 | Scott | 124/73 |
| 6,552,284 B1 | * | 4/2003 | Drago | 200/83 R |

\* cited by examiner

*Primary Examiner*—K. Lee
(74) *Attorney, Agent, or Firm*—Rosenberg, Klein & Lee

(57) ABSTRACT

A pressure regulator for a paint ball gun includes a cylinder, a piston unit, an elastic member, a top connector and a switch bolt. The cylinder includes upper and lower chambers. The piston unit includes a ring plate and a tube. The ring tube is disposed in the upper chamber. The tube inserts through the separation plate. The tube has a closed lower end and is provided with a side hole near the lower end. The switch bolt is provided with a cylindrical opening in the upper section. The piston unit and the elastic member are accommodated in the cylinder. The top connector is fastened to the upper chamber. The elastic member holds against the ring plate and the separation plate. The switch bolt is fastened to the lower chamber. The tube slides into the cylindrical opening.

4 Claims, 4 Drawing Sheets

PRESSURE REGULATOR FOR A PAINT BALL GUN

BACKGROUND OF THE INVENTION (a) Field of the Invention

The present invention relates to a pressure regulator for a paint ball gun, and more particularly to one that controls the switch, regulates air supply amount, and automatically cuts off the air supply.

(b) Description of the Prior Art

A conventional pressure regular for a paint gun has a switch bolt to directly hold against a valve and a spring. Upon switching on or off the valve, the extent of compression the spring subject to is also adjusted; that is, the pressure of the working air is adjusted at the same time. Therefore, it is very troublesome to readjust the pressure upon operating the switch each time. In the prior art, is the air supply is not interrupted once it is switched on; however, the paint ball gun needs to drain the air after each shot to wait for the next paint ball to fall into position in the barrel before the air is refilled in the barrel for the next shot. Accordingly, during continuous shooting, air supply is not required during the intermission between the time the barrel is filled up with air and the trigger is pulled. However, within such a short intermission, the switch to supply air is not turned off, meaning loss, thus waste of certain pressurized air.

SUMMARY OF THE INVENTION

In view of those flaws found with the striking structure of a paint ball gun of the prior art, the primary purpose of the present invention is to provide a pressure regulator for a paint ball gun that regulates the pressure of the working air by adjusting the relative fastening locations between a top connector and a cylinder; controls a switch of pressurized air source and the air supply amount by adjusting a switch bolt; and avoids waste of pressurized gas by having the pressurized in the cylinder to compress a ring plate to automatically cut off air source.

To achieve the purpose, the present invention comprises a cylinder, a piston unit, an elastic member, a top connector and a switch bolt. The cylinder is hollow and includes an upper chamber and a lower chamber apart from each other by means of a separation plate. A through hole is disposed on the separation plate. An air hole is provided in the upper section of the lower chamber to guide the pressurized air to flow into the lower chamber. Both the upper edge of the upper chamber and the middle section of the lower chamber are provided with thread.

The piston unit is hollow and includes a ring plate and a tube. The outer diameter of the ring plate corresponds to the inner diameter of the upper chamber in the cylinder. The outer diameter of the tube corresponds to the inner diameter of the through hole in the separation plate of the cylinder. The upper end of the tube is fixed to the inner edge of the ring plate. The lower end of the tube is closed. A side hole is disposed near the lower end of the tube to connect through the inner side and the outer side of the tube.

The elastic member sleeved on the piston unit is provided with an upper end and a lower end.

The top connector is hollow and provided with a lower end. The lower end is externally provided with thread corresponding to the thread in the upper chamber of the cylinder.

The switch bolt has a cylindrical opening disposed on the inner side of the upper section of the switch bolt corresponding to the tube of the piston unit. The outer side of the switch bolt is provided with thread corresponding to the thread in the lower chamber of the cylinder.

Accordingly, both the piston unit and the elastic member are accommodated within the upper chamber of the cylinder. The top connector is fixed to the inner upper edge of the upper chamber with the upper end of the elastic member holding against the ring plate of the piston unit and the lower end of the elastic member holding against the separation plate of the cylinder. The ring plate holds against the lower end of the top connector. The switch bolt is fastened to the lower chamber of the cylinder, and the tube of the piston unit slides into the cylindrical opening of the switch bolt.

A sealing member is provided to the outer side of the ring plate of the piston unit to hold in airtight fashion against the inner wall of the upper chamber. Another sealing member is provided to the separation plate of the cylinder to hold against in airtight fashion the tube of the piston unit while providing airtight separation between the upper chamber and the lower chamber.

Another sealing member is provided to the inner wall of the upper edge of the cylindrical opening of the switch bolt to hold in airtight fashion against the tube of the piston unit while providing airtight separation between the lower chamber of the cylinder and the cylindrical opening of the switch bolt.

The present invention provides the following advantages:

1. Multiple functions including on-off operation of the air supply, maintaining supply of pressurized air at a fixed amount, regulation of air pressure, and automatic air supply cut-off in a simple structure;

2. Changes in the amount of air supply by changing the diameter of the ring plate and that of the side hole; and 3. A working pressure source that features large flow, fast reacting and minimized variation in pressure output.

DETAILED DESCRIPTION OF THE PREFERRED EMBODIMENTS

Figure 1:
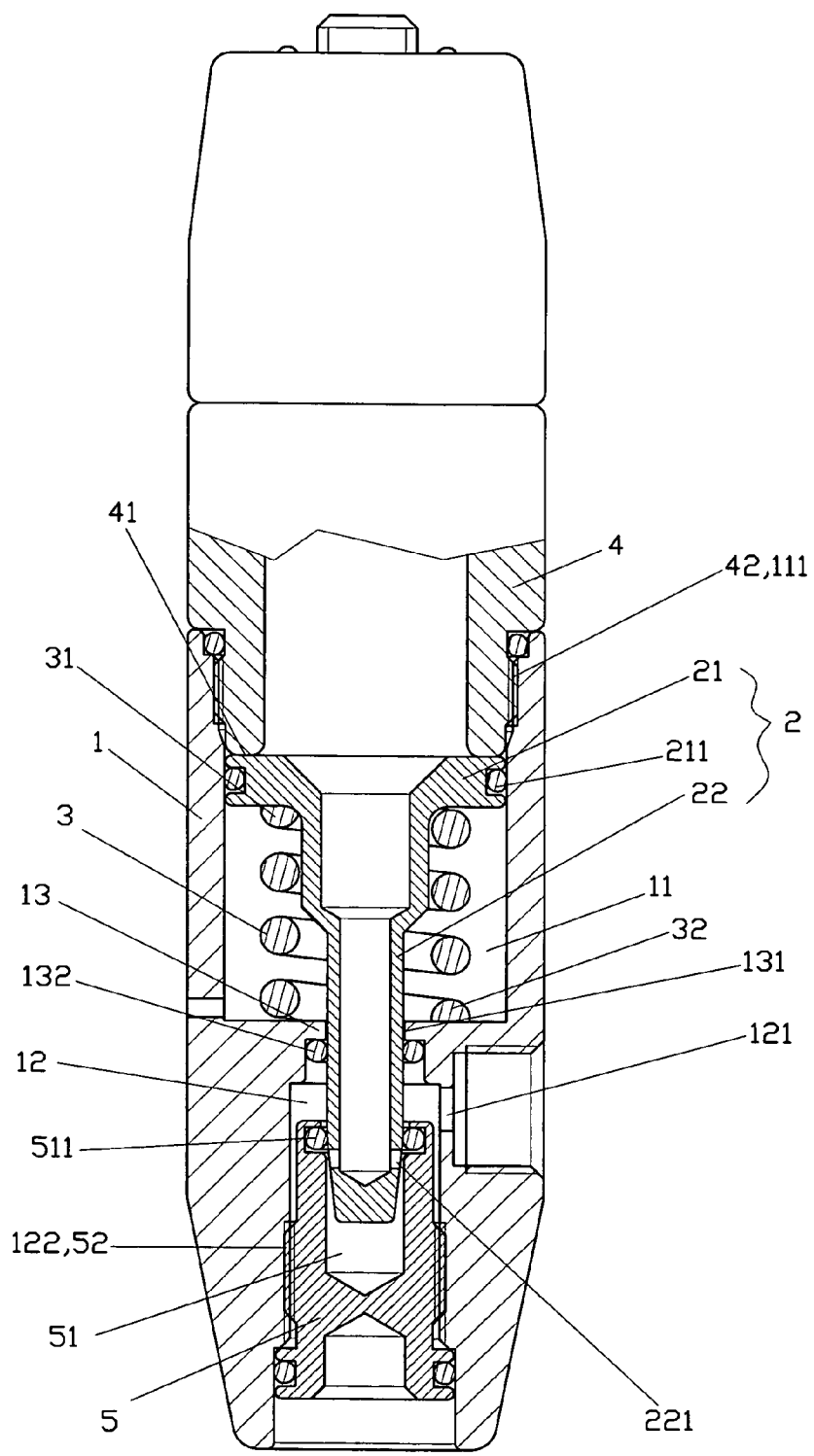
FIG. 1 is a cross-sectional view of a preferred embodiment of the present invention.

Referring to FIG. 1, a preferred embodiment of the present invention includes a cylinder (1), a piston unit (2), an elastic member (3), a top connector (4) and a switch bolt (5).

The cylinder (1) is hollow and includes an upper chamber (11) and a lower chamber (12). A separation plate (13) is provided between the upper chamber (11) and the lower chamber (12). The separation plate (13) is provided with a through hole (131). An air hole (121) is disposed in the upper section of the lower chamber (12) to guide the pressurized air to flow into the lower chamber (12). In the upper edge of the upper chamber (11) and in the middle section of the lower chamber (12) are provided with thread (111) and thread (122), respectively.

The piston unit (2) is hollow and includes a ring plate (21) and a tube (22). The outer diameter of the ring plate (21) corresponds to the inner diameter of the upper chamber (11) of the cylinder (1). The outer diameter of the tube (22) corresponds to the inner diameter of the through hole (131) of the separation plate (13) of the cylinder (1). The upper end of the tube (22) is fixed to the inner edge of the ring plate (21). The lower end of the tube (22) is closed. A side hole (221) is disposed near the lower end of the tube (22) to connect through the inner side and the outer side of the tube (22).

The elastic member (3) sleeved on the outside of the piston unit (2) comprises an upper end (31) and a lower end (32).

The top connector (4) is hollow and comprises a lower end (41). The lower end (41) is externally provided with thread (42) corresponding to the thread (111) of the upper chamber (11) in the cylinder (1).

The switch bolt (5) is provided with a cylindrical opening (51) in the upper section corresponding to the tube (22) of the piston unit (2). The switch bolt (5) is externally provided with thread (52) corresponding to the thread (122) on the lower chamber (12) in the cylinder (1).

Both the piston unit (2) and the elastic member (3) are accommodated in the upper chamber (11) of the cylinder (1). The top connector (4) is fastened with the thread (42) to the thread (111) inside the upper edge of the upper chamber (11) in the cylinder (1). The upper end (31) of the elastic member (3) holds against the ring plate (21) of the piston unit (2), while the lower end (32) of the elastic member (3) holds against the separation plate (13) of cylinder (1). The ring plate (21) holds against the lower end (41) of the top connector (4). The switch bolt (5) is fastened to the lower chamber (12) in the cylinder (1). The tube (22) of the piston unit (2) is inserted into the cylindrical opening (51) of the switch bolt (5).

A sealing member (211) is provided externally on the ring plate (21) of the piston unit (2) to hold in airtight fashion against the inner wall of the upper chamber (11) in the cylinder (1).

A sealing member (132) is provided on the separation plate (13) of the cylinder (1) to hold in airtight fashion against the tube (22) of the piston unit (2) and to separate the upper chamber (11) and the lower chamber (12) in airtight fashion.

A sealing member (511) is provided in the inner wall of the upper edge of the cylindrical opening (51) in the switch bolt (5) to hold in airtight fashion against the tube (22) of the piston unit (2) and to separate the lower chamber (12) in the cylinder (1) and the cylindrical opening (51) of the switch bolt (5) in airtight fashion.

Figure 2:
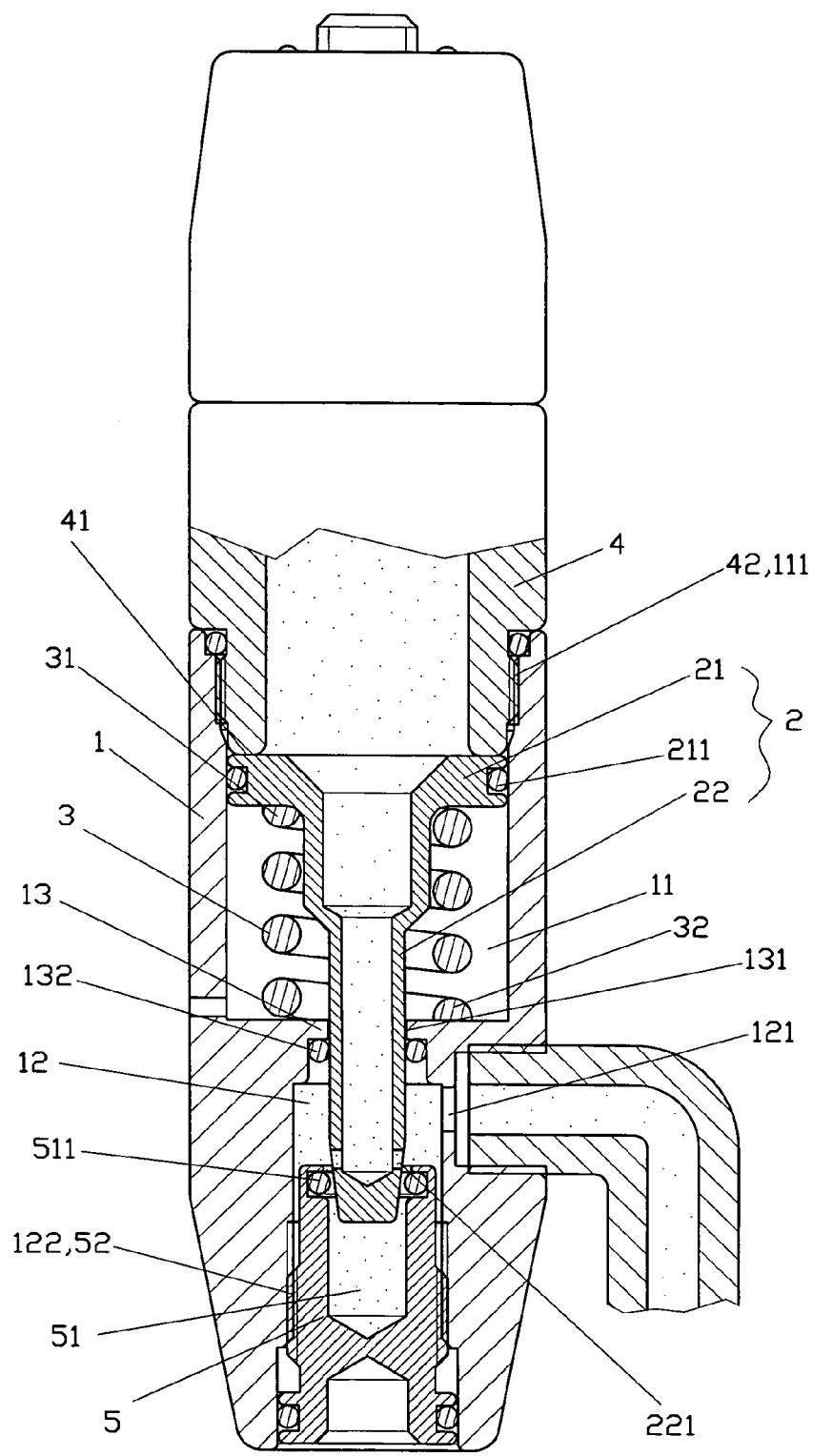
FIG. 2 is a cross-sectional view showing the preferred embodiment of the present invention before the pressure regulation.
Figure 3:
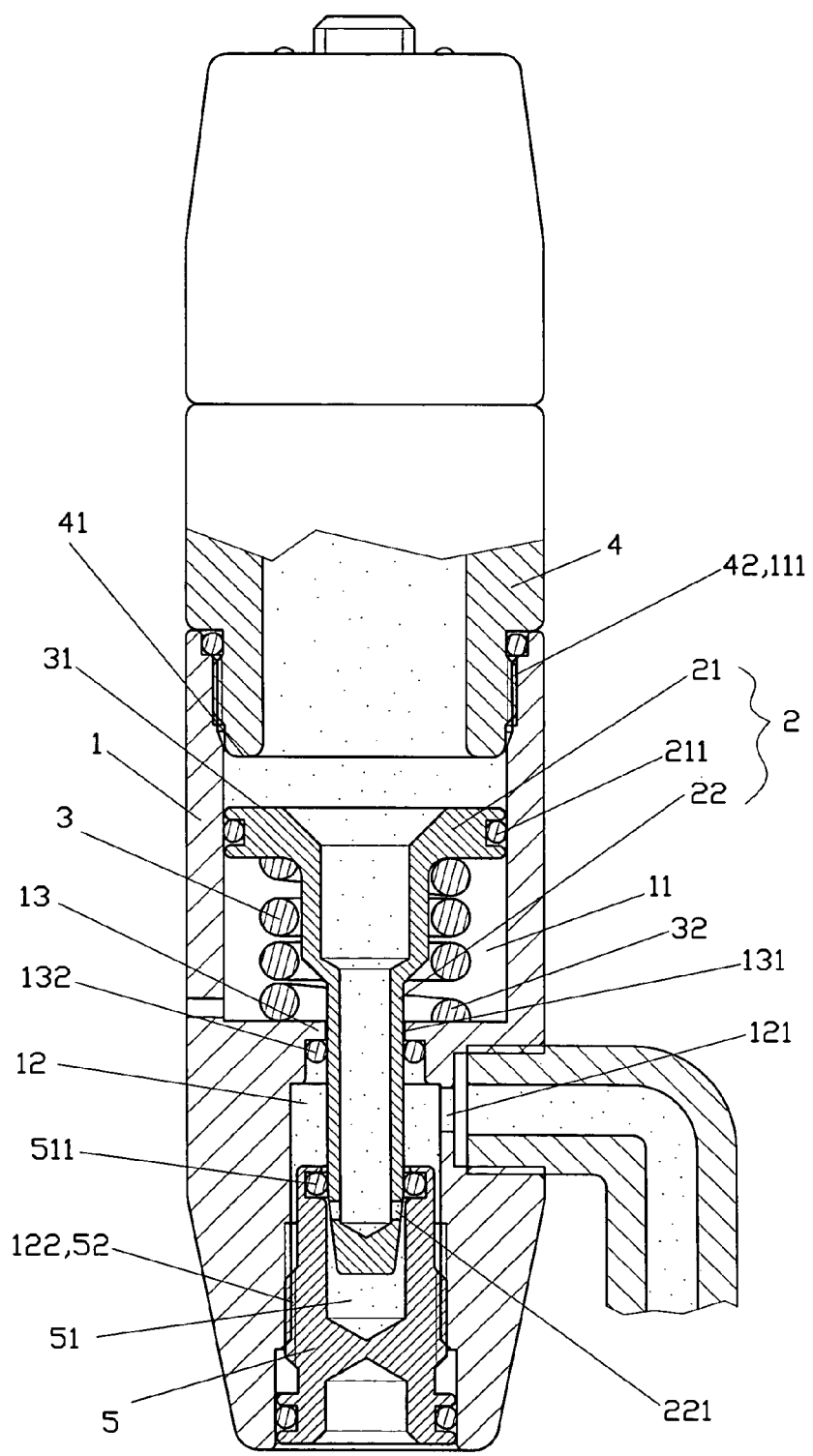
FIG. 3 is a cross-sectional view showing the preferred embodiment of the present invention after the pressure regulation.

Now referring to FIG. 2, the supply source of pressurized air is connected to the air hole (121) to enter into the lower chamber (12). The switch bolt (5) is turned to retreat to the side hole (221) of the tube (22) and to get exposed out of the cylindrical hole (51) for connecting through the tube (22) and the lower chamber (12) externally to the switch bolt (5), and the pressurized air then enters from the lower chamber (12) into the inner side of the tube (22), and further into the top connector (4). Whereas the pressurized air is filled up in the top connector (4) before the working air is drained (e.g., when the paint ball is fired), and when the pressurized air applied to the piston unit (2) [(pressure)×(the sum of the inner bottom area of the ring plate (21) and the tube (22))] is greater than the force of the elastic member (3), the side hole (221) of the tube (22) retreats into the cylindrical opening (51) subject to the compression by the piston unit (2), as illustrated in FIG. 3, to prevent pressurized air from entering into the tube (22). Once the pressurized air in the top connector (4) is drained after the striking of a paint ball, the force of the elastic member (3) causes the piston unit (2) to return to its original position, as illustrated in FIG. 2. Again, the pressurized air is filled up in the top connector (4). Therefore, the present invention allows opening or closing the air supply and controls the air supply at a fixed amount by automatically cutting of the air supply.

If the adjustment of the working demand of the pressurized air is desired, the amount of pressurized air supplied can be altered by changing the diameter of the ring plate (21) and the bore of the side hole (221).

Figure 4:
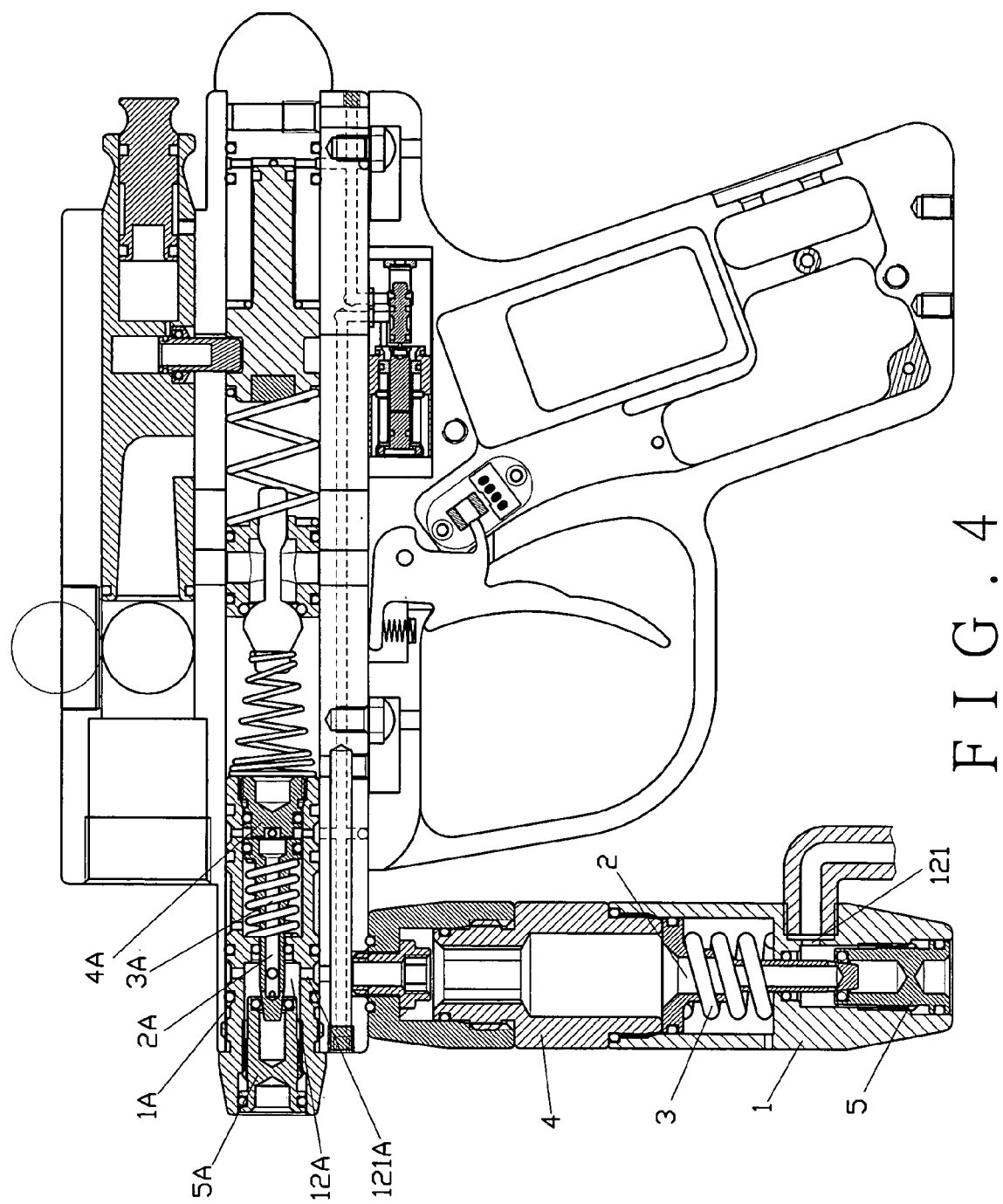
FIG. 4 is a cross-sectional view showing the present invention applied to a paint ball gun.

As illustrated in FIG. 4, the present invention applied to a paint ball gun comprises the cylinder (1), the piston unit (2), the elastic member (3), the top connector (4) and the switch bolt (5). The air hole (121) is connected to a pressurized air flask (a prior art/not illustrated). In another preferred embodiment, the present invention comprises a cylinder (1A), a piston unit (2A), an elastic member (3A), a top connector (4A) and a switch bolt (5A). An air hole (121A) is connected to the exit of the preceding preferred embodiment. The top connector (4A) is another piston held against by another elastic member. The aforesaid preferred embodiments are for the purpose of showing that it is feasible for them to be applied to the paint ball gun, thus details of their operations are not elaborated herein. Similarly, all the preferred embodiments of the present invention can be also applied to any other occasion that requires pressurized air to operate.

What is claimed is:

1. A pressure regulator for a paint ball gun comprising a cylinder, a piston unit, an elastic member, a top connector and a switch bolt;

the cylinder being hollow and comprising an upper chamber and a lower chamber, a separation plate being provided between the upper chamber and the lower chamber, a through hole being disposed on the separation plate, an air hole being provided in an upper section of the lower chamber to guide pressurized air to flow into the lower chamber, an upper edge of the upper chamber and a middle section of the lower chamber being provided with thread;

the piston unit being hollow and comprising a ring plate and a tube, the ring plate having an outer diameter corresponding in size to an inner diameter of the upper chamber in the cylinder, the tube having an outer diameter corresponding in size to an inner diameter of the through hole of the separation plate of the cylinder, an upper end of the tube being fixed to an inner edge of the ring plate, the tube having a closed lower end and a side hole near the lower end;

the elastic member sleeved on the piston unit having an upper end and a lower end;

the top connector being hollow and having a lower end, the lower end of the top connector being externally provided with thread corresponding to the thread in the upper chamber of the cylinder;

the switch bolt having a cylindrical opening disposed on an inner side of an upper section corresponding to the tube of the piston unit, the switch bolt being externally provided with thread corresponding to the thread in the lower chamber of the cylinder;

the piston unit and the elastic member being accommodated within the upper chamber of the cylinder, the top connector being fastened to the upper edge of the upper chamber with the upper end of the elastic member holding against the ring plate of the piston unit and the lower end of the elastic member holding against the separation plate of the cylinder, the ring plate holding against the lower end of the top connector, the switch bolt being fastened to the lower chamber of the cylinder, the tube of the piston unit sliding into the cylindrical opening of the switch bolt.

2. The pressure regulator for a paint ball gun of claim 1, wherein the ring plate of the piston unit is externally provided with a sealing member to hold in airtight fashion against an inner wall of the upper chamber in the cylinder.

3. The pressure regulator for a paint ball gun of claim 1, wherein the separation plate of the cylinder is provided with a sealing member to hold in airtight fashion against the tube of the piston unit and to separate the upper chamber and the lower chamber in airtight fashion.

4. The pressure regulator for a paint ball gun of claim 1, wherein the cylindrical opening of the switch bolt is provided with a sealing member at an inner wall of an upper edge to hold in airtight fashion against the tube of the piston unit and to separate the lower chamber in the cylinder and the cylindrical opening of the switch bolt in airtight fashion.

* * * * *